JAMES J. HILL
Inventor

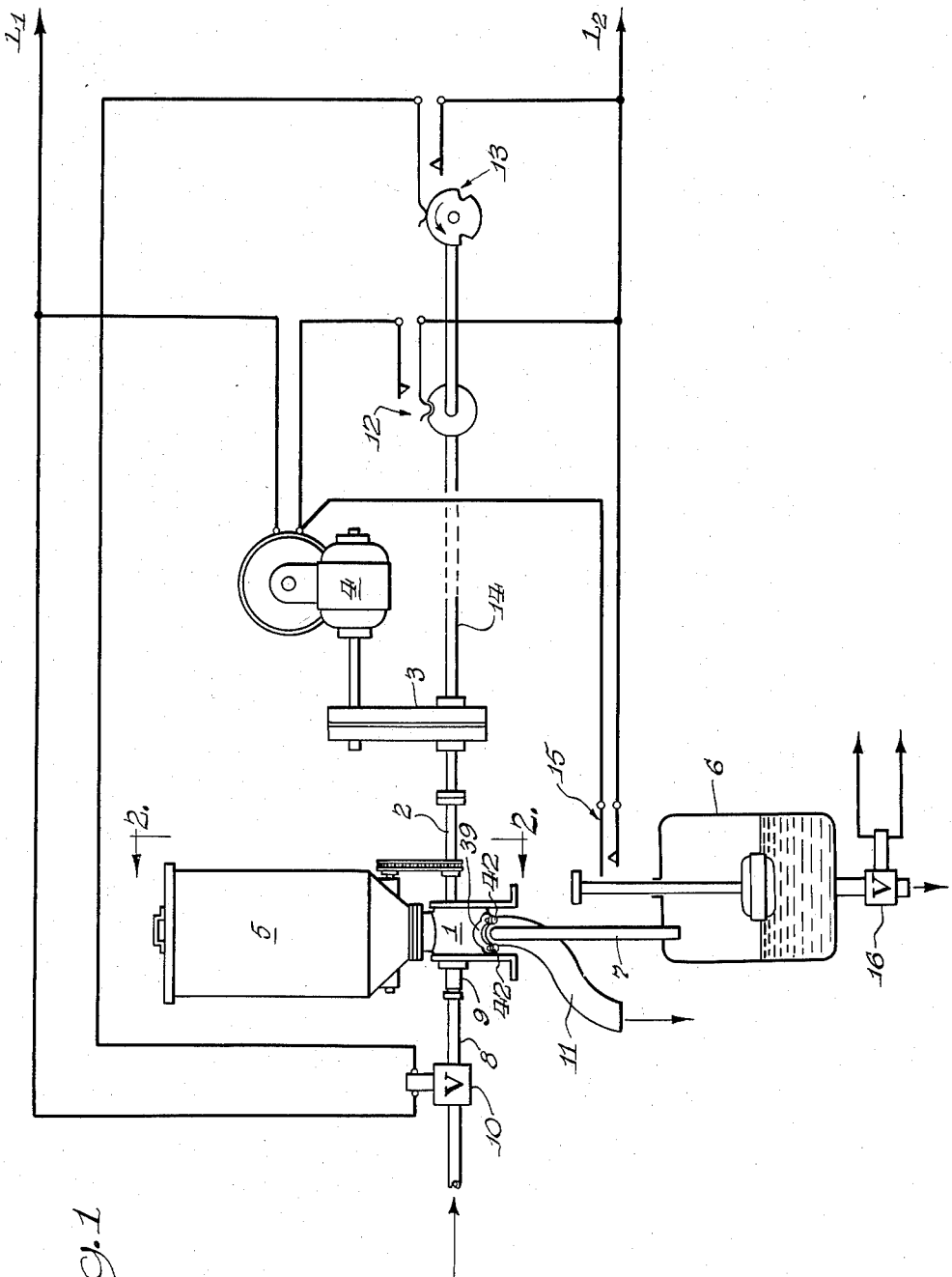

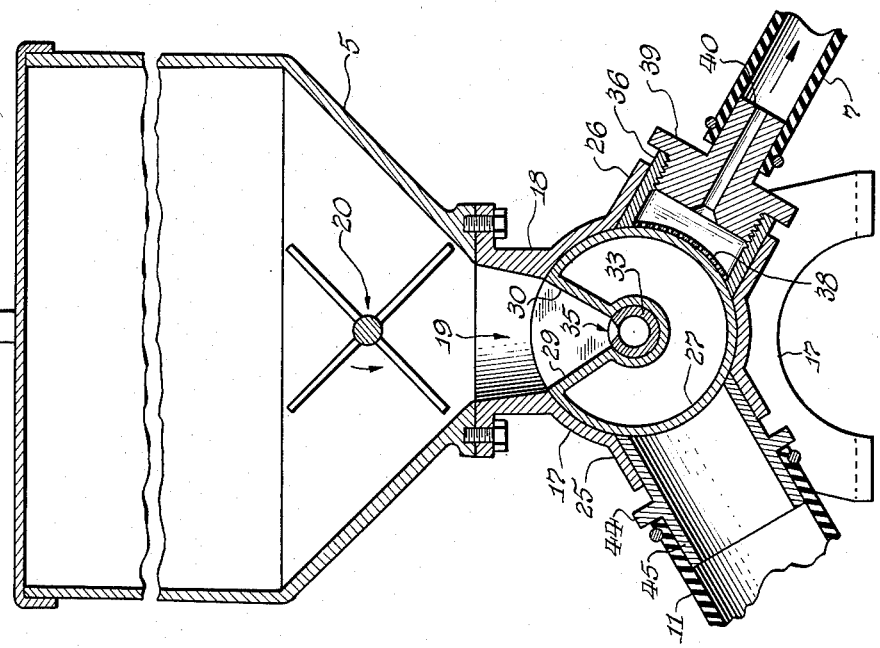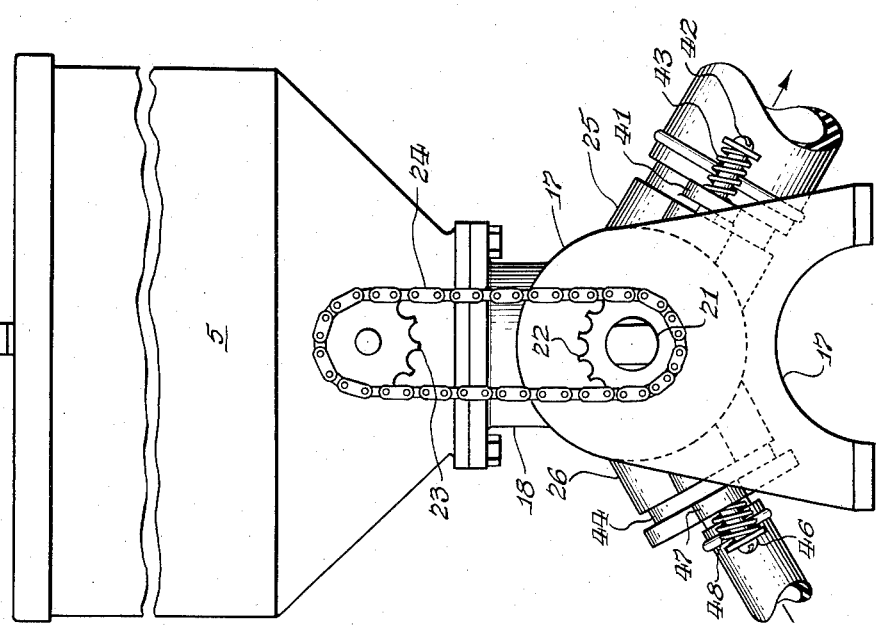

_United States Patent Office_

2,971,454
Patented Feb. 14, 1961

2,971,454

CONTINUOUS TEA MAKER

James J. Hill, Miami, Fla., assignor to Apco, Inc., a New York company

Filed Jan. 6, 1958, Ser. No. 707,172

2 Claims. (Cl. 99—289)

This invention relates in general to machines for making infusion type beverages and more particularly, to an automatic machine for the continuous production of unit quantities of tea and like beverages.

Machines previous to this invention used a variety of complicated structures such as a plurality of movable canisters or reciprocating chambers for accomplishing the loading infusion delivery and scavenger cycles for making the beverages. Such devices are excessively complicated, expensive, difficult to service, and result in a questionable degree of sanitation.

When tea is used, unlike coffee grounds, the spent leaves are particularly difficult to scavenge from an infusion chamber because of the adhering nature of wet leaves.

The present invention is a solution for this long sought problem and overcomes the above objections and disadvantages by the provision of a relatively simple low-cost and sealed rotary device which performs all of the cycles required for continuously producing unit quantities of beverage by the intermittent movement of a principal element therein, which device embraces the principal object of the machine.

Another object of the invention is the provision of a ported cylindrical housing in which a cylinder is adapted to intermittently rotate to receive infusion ingredients, transfer same for infusion and the delivery of the finished beverage, and upon further rotation to completely scavenge the spent ingredients for each revolution of said barrel.

A further object of the invention is the provision of a cylindrical housing with a ported rotary transfer cylinder therein including stationary delivery manifolds adapted to operate in sealed relation with said barrel.

Another object of the invention is a provision of a rotary infusion cylinder having a segmental cavity therein for infusing tea ingredients including an elongated orifice means for directing pressurized water into said cavity for scavenging spent ingredients therefrom.

These and other objects and advantages in one embodiment of the invention are described and shown in the following specification and drawings in which:

The improvements hereinafter described are related to pending U.S. application of Lloyd J. Andres, "Continuous Beverage Maker," Serial Number 625,006.

Fig. 1 is a diagrammatic showing of the machine including drive and control elements connected thereto.

Fig. 2 is an enlarged fragmentary elevation of the machine viewed from section line 2—2, Fig. 1.

Fig. 3 is a cross-sectional elevation of the machine shown Fig. 2.

Figure 8:
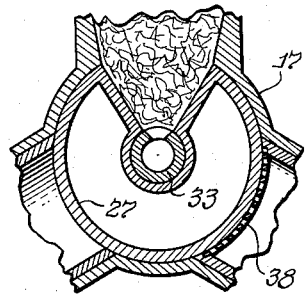
Figs. 8, 9 and 10 are diagrammatic illustrations of the cyclic operation of the machine.

Fig. 1 diagrammatically illustrates the beverage maker as used in a machine which will produce unit quantities of finished beverage automatically. The infusion device 1 is intended to be operated by a single shaft 2 connected to an intermittent movement 3 driven by a gear motor 4. A hopper 5 secured to the upper portion of the infusion device retains a quantity of the ingredient used which is gravitated into the infusion device as will hereinafter be described. A float controlled reservoir 6 is positioned to receive a finished beverage from conduit 7 connected to the infusion device as shown.

A water inlet conduit 8 is connected to the infusion device by a rotary coupling 9 and will periodically admit hot water into infusion device by the cyclic operation of the electric solenoid valve 10.

A waste conduit 11 is attached to the infusion device for conducting therefrom the spent ingredients and rinse water following an infusion cycle. Cam switches 12 and 13 are controlled by shaft 14 which is coupled to shaft 2.

An electric circuit under the control of float switch 15 connects the gear motor 4, valve 10, and the cam switches 12 and 13 to a source of electric power $L_1$ and $L_2$.

An electric solenoid valve 16 connected to the reservoir 6 is provided for dispensing various quantities of finished beverage.

Referring to Figs. 2 and 3, the infusion device consists of a main housing 17 having an ingredient inlet branch 18, forming an ingredient inlet port 19, to which is secured hopper 5 as shown.

An agitator assembly 20 journalled in the hopper as shown is rotated by a main shaft 21, sprockets 22, 23 and chain 24 for the purpose of preventing packing and bridging of the ingredients at the port 19. The housing 17 also has integral branches 25 and 26 which form ports for the finished beverage and for scavenging the spent ingredients respectively.

Figure 4:
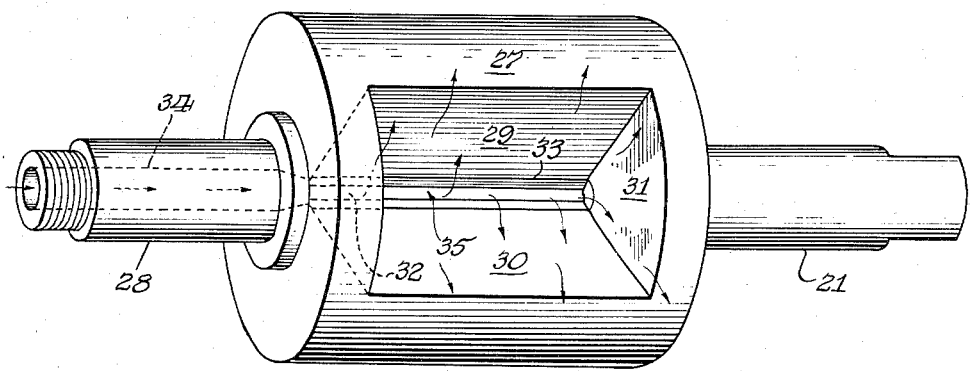
Fig. 4 is an enlarged perspective view of the infusion barrel in the machine shown Figs. 1 and 2.

Referring to Figs. 3 and 4, a cylinder 27 is coaxially secured to main shaft 21 and water inlet shaft 28 with the outer periphery of the cylinder in close proximity to the wall of the bore in the housing 17.

The shafts 21 and 28 are journalled for rotation in opposite sides of the housing 17.

A segmental cavity defined by walls 29, 30, 31 and 32 form a pocket for receiving and infusing the beverage ingredients. Shaft 28 includes a coaxial extended diffusion tube 33 fixed therein and having a bore therethrough co-linear with the bore 34, in shaft 28.

The tube 33 has an elongated orifice 35 positioned as shown for uniformly directing incoming water outward along the walls of the cavity conducted by shaft 28 for infusion and rinsing purposes as shown by virtue of the increase in velocity of the water through the orifice as compared to velocity of the water in the bore of the tube 33.

Figure 5:
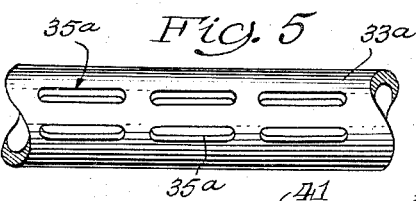
Fig. 5 is a fragmentary view of a water diffuser alternate to that shown in Fig. 4.
Figure 6:
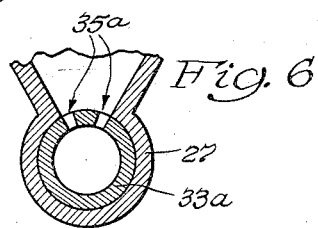
Fig. 6 is a fragmentary cross-sectional view of the water diffuser shown Fig. 5, positioned in the cylinder shown Fig. 4.

Figs. 5 and 6 show an alternate diffusion tube 33a in which a series of elongated slots 35a are positioned in the infusion cavity as shown in Fig. 6. This alternate form of tube is adapted for use with a particular kind of leafy ingredient to be hereinafter described.

Figure 7:
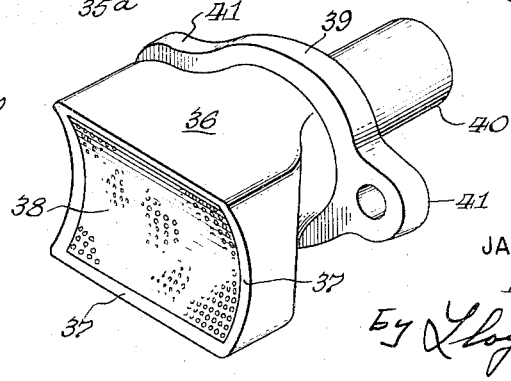
Fig. 7 is a perspective view of the filter assembly shown Figs. 1, 2 and 3.

Referring to Fig. 7, a hollow housing 36 having a cylindrical inner end surface 37 is slideably positioned in manifold 26. A foraminated filter member 38 is secured in the end of housing 36, said filter having a cylindrical outer contour substantially flush with the surface 37. A flange 39 having a bore therethrough is threaded into housing 36 as shown and is provided with an extension 40 over which the beverage outlet conduit 7 is secured.

Referring to Figs. 2 and 7, the flange 39 is provided with a pair of oppositely positioned ears 41—41 through which a pair of screws 42—42 are threaded into the housing 17. Each screw 42—42 having a spring 43 positioned between the flange and the head thereof as shown urges surface 37 of the housing 36 into sealed contact with the periphery of the cylinder 27 with the filter 38 in registered position bridging the infusion cavity for the infusion cycle.

The scavenger sleeve 44 has an inner end substantially the same as the housing 36 and is provided with an extension 45 over which the waste conduit 11 is secured. A pair of screws 46 are secured in the housing through oppositely disposed ears 47 integral with the sleeve, in the same manner as the screws 42—42. A pair of springs 48 as illustrated in Fig. 2 retains the sleeve 44 in sealed contact with the cylinder 27 and positioned to bridge the infusion cavity in the cylinder when rotated in register therewith.

Figure 9:
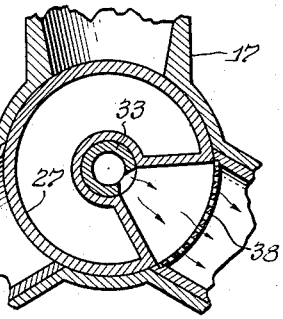
Figure 10:
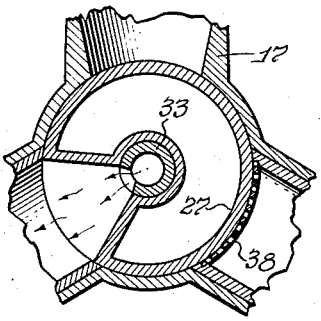

Figs. 8, 9 and 10 show the three cyclic positions of the cylinder required to complete one infusion cycle for the preparation of one unit quantity of beverage.

Fig. 8 shows the gravity descent of the beverage ingredient from the hopper 5 into infusion cavity in the cylinder 27.

Fig. 9 shows the position of the cylinder following the first rotation thereof with the infusion cavity coincident with the filter assembly whereby pressurized water released to flow through shaft 28 and the infusion tube will disburse and infuse through the ingredient in the cavity permitting the finished beverage to flow through housing 36 and conduit 7. It is to be noted that the surface 37 on the housing 36 remains in sealed contact with the cylinder surrounding the infusion cavity.

Fig. 10 shows the position of the cylinder following the second rotation thereof to a position with the infusion cavity in register with the scavenger sleeve 44 whereby pressurized water flowing from the elongated orifice in the diffusion tube will follow a segmental pattern and completely scavenge the infusion cavity by removing the spent ingredients from the walls 29, 30, 31 and 32 and displace same through the waste conduit 11.

The above cyclic operations are automatically performed by means of the components illustrated in Fig. 1 as follows:

When the finished beverage in reservoir 6 has descended to a predetermined level, switch 15 will close energizing gear motor 4 whereby the intermittent movement 3 will rotate the cylinder 27 from the position shown Fig. 10 to the position shown Fig. 8. The intermittent rotation for the three required cyclic positions are maintained by the automatic closure of switch 12.

Following a predetermined period of dwell at the position shown Fig. 8, the infusion cavity will have filled with dry ingredients at which time the cylinder will rotate to the position shown Fig. 9. Simultaneously switch 13 will close and release pressurized water from valve 10 through the diffusion tube into the infusion cavity whereby the infusion process will take place and the finished beverage will pass through the filter 38 and thence through conduit 7 to the reservoir 6.

Following a predetermined dwell at the infusion position, the cylinder will move to the position shown Fig. 10 whereby switch 13 will again close and permit water to flow through the infusion tube and because of the novel elongated orifice in the infusion tube, the incoming water in flowing across the walls 29, 30, 31 and 32 will remove the spent ingredients therefrom for passage through the scavenger sleeve 44 and the waste conduit 11. The construction of the infusion cavity and the infusion tube is of particular importance related to the scavenging operation since it is necessary to remove all traces of spent ingredients such as tea from the infusion chamber and the sides thereof. The particular segmental shape and the shape of the orifice in the infusion tube readily accomplish this purpose.

Where particular large leaf tea is used as an ingredient, the alternate infusion tube shown Figs. 5 and 6 is particularly effective in scavenging the infusion cavity, since the separate elongated orifices direct separate segmental patterns of water flow which breaks down the bridging mass of spent tea which normally adhere to the walls of the infusion cavity.

Having described my invention, I claim:

1. In a continuous tea maker machine of the character described a housing forming a cylinder with openings through the wall thereof forming an inlet port for beverage ingredients, an outlet port for infused products, and a scavenger outlet port, substantially normal to the axis of said cylinder for conducting spent material, a hopper mounted above and in communication with said inlet port, a rotor journalled in said housing at opposite ends thereof for coaxial rotation in said cylinder with the outer surface thereof in close proximity to the wall of said cylinder and having a coaxial bore therein entering one end thereof, said rotor having a segmental cavity extending into said outer surface for rotating spent material therein into register with said scavenger port in a discharge position, said cavity defined by substantially planar radial walls adapted to coincide with the inner shape and margin of said scavenger port and terminating in an inner apex forming elongated orifice means opening into said bore parallel the axis thereof, said orifice being in fixed alignment with said apex of said segmental cavity, a source of pressurized water, conduit means including a rotary coupling and valve means connecting said bore and said source of water whereby the operation of said valve means will permit water to enter said bore and be projected by said orifice means along the walls of said cavity to discharge said spent ingredients from said cavity through said scavenger port when said rotor is rotated to said discharge position, and whereby said elongated orifice means directs patterns of water flow along said walls to break down the bridging mass of spent material that adheres to the said radial walls of said cavity.

2. In a continuous tea maker machine of the character described a housing forming a cylinder with openings through the wall thereof forming an inlet port for beverage ingredients, an outlet port for infused products, and a scavenger outlet port, substantially normal to the axis of said cylinder for conducting spent material, a hopper mounted above and in communication with said inlet port, a rotor journalled in said housing at ends thereof for coaxial rotation in said cylinder with the outer surface thereof in close proximity to the wall of said cylinder and having a coaxial bore therein entering one end thereof, said rotor having a segmental cavity extending into said outer surface for rotating spent material therein into register with said scavenger port in a discharge position, said cavity defined by substantially planar radial walls adapted to coincide with the inner shape and margin of said scavenger port and terminating in an inner apex forming an elongated opening into said bore parallel therewith, said orifice being in fixed alignment with said apex of said segmental cavity, a tube having a plurality of elongated radial orifices in predetermined linear spaced relation, said tube secured in said bore with a predetermined portion of said plurality of orifices positioned adjacent each side of said elongated opening with one edge of each of said orifices co-planar with a corresponding wall of said cavity, a source of pressurized water, conduit means including a rotary coupling and valve means connecting said tube and said source of water whereby the operation of said valve means will permit water to enter said tube and be projected by said orifices along the walls of said cavity to discharge said spent ingredients from said cavity through said scavenger port when said rotor is rotated to said discharge position, and whereby said elongated orifice means directs patterns of water flow along said walls to break down the bridging mass of spent material that adheres to the said radial walls of said cavity.

References Cited in the file of this patent

UNITED STATES PATENTS

| | | |
|---|---|---|
| 1,804,795 | Lee | May 12, 1931 |
| 2,014,325 | Grilli | Sept. 10, 1935 |
| 2,292,276 | Knoll | Aug. 4, 1942 |
| 2,452,933 | Jopich et al. | Nov. 2, 1948 |
| 2,537,053 | Hemmeter | Jan. 9, 1951 |
| 2,898,843 | Rockriver | Aug. 11, 1959 |

FOREIGN PATENTS

| | | |
|---|---|---|
| 279,363 | Germany | Oct. 19, 1914 |
| 467,300 | Italy | Dec. 1, 1951 |
| 1,118,772 | France | Mar. 26, 1956 |
| 780,996 | Great Britain | Aug. 14, 1957 |